INVENTOR,
ERHARD LANGECKER

BY Watson, Cole, Grindle & Watson
ATTORNEYS

INVENTOR,
ERHARD LANGECKER

BY Watson, Cole, Grindle & Watson
ATTORNEYS

April 18, 1972  E. LANGECKER  3,657,405
PROCESS FOR THE APPLICATION OF A LABEL ON A HOLLOW
BODY MADE OF THERMOPLASTIC MATERIAL
Filed May 28 1970  4 Sheets-Sheet 3
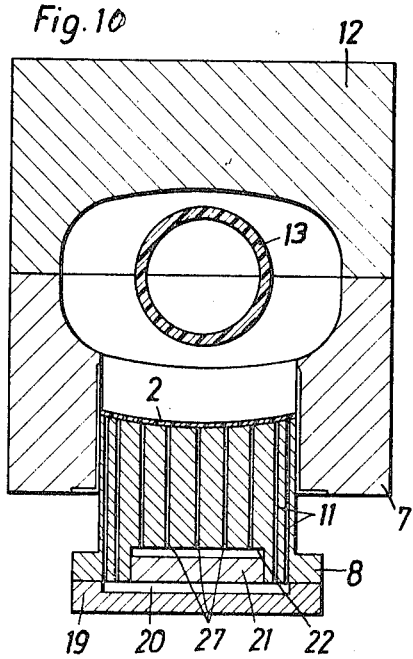
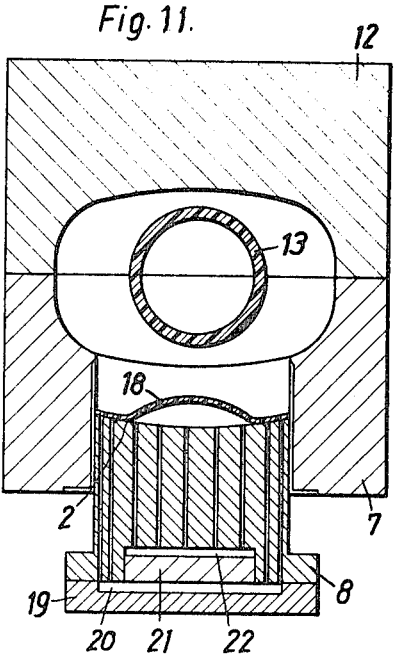
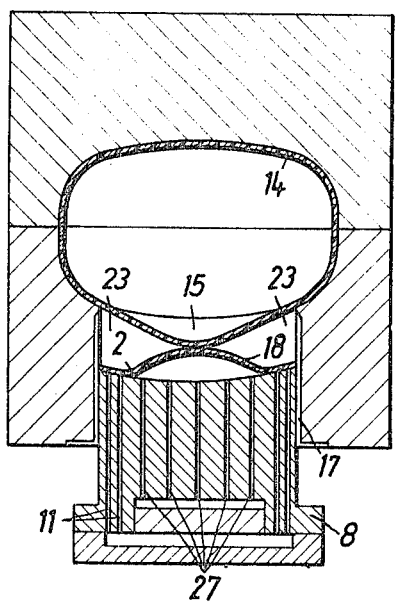
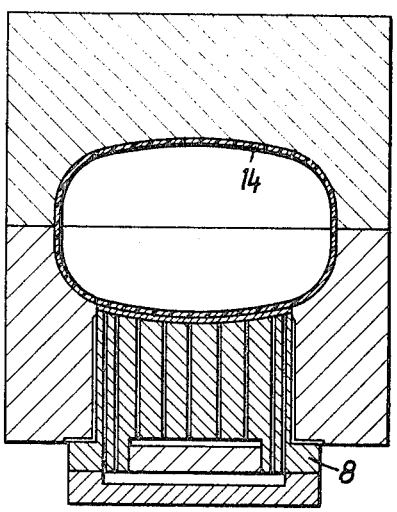
Inventor:
Erhard Langecker
By Watson, Cole, Grindle + Watson
Attys.

Inventor:
Erhard Langecker
By
Watson, Cole, Grindle & Watson
Attys.

United States Patent Office 3,657,405
Patented Apr. 18, 1972

3,657,405
PROCESS FOR THE APPLICATION OF A LABEL ON A HOLLOW BODY MADE OF THERMOPLASTIC MATERIAL
Erhard Langecker, Hohbuschener Weg. 5, Meinerzhagen, Westphalia, Germany
Continuation-in-part of application Ser. No. 767,719, Oct. 15, 1968. This application May 28, 1970, Ser. No. 41,194
Claims priority, application Germany, Aug. 22, 1968, P 17 86 133.5; June 5, 1969, P 19 28 596.2
Int. Cl. B29c 17/07; B29d 23/03; B32b 31/12
U.S. Cl. 264—89
4 Claims

ABSTRACT OF THE DISCLOSURE

Process for the application of a label on a hollow body of thermoplastic material wherein the label is placed on a movable curved-end member of a blow-mold device while said member is maintained in a retracted position with respect to the cavity of the blow-mold device. A blow blank is inserted into the blow-mold cavity, after which the central portion of the label is caused to be moved out in the direction of the blow blank so that after the blow blank is blown up, said member with the label is moved inwardly against the inflated blow blank and the air between the blank and the label is passed to the exterior of the mold.

In a blow-moulding process, a label is applied to the blow-moulded article while it is still in the mould by placing the label on the front end of a plunger which is initially retracted in a recess in the mould wall. When the article has been blown up, the plunger is advanced to apply the label to the article. Initial contact between the label and the article is over a small area which progressively increases as air is excluded from between the article and the label.

This invention relates to a process for applying labels or plates to hollow articles of thermoplastic synthetic substances produced by blow moulding, and is a continuation-in-part of my co-pending application Ser. No. 767,719 filed on Oct. 15, 1968.

It is known that a coloured and/or printed element of a thin foil of weldable adhesive material inserted into a blow mould may be joined to the hollow article being moulded during inflation or blowing of the latter, an appropriate procedure applicable being that the element is fed in by insertion either from outside the mould through openings in its wall or from the inside through the partition line of parting of the blow mould.

In an operation of this nature for placing a label or plate on a hollow article produced by blowing, the problem of air entrapped between the hollow article and the label while applying the label must be avoided. To this end, the surface of the label or plate coming into contact with the article has been roughened, so that air trapped during application of the label is uniformly distributed in the depressions formed by the roughening action, thereby preventing the formation of spot-like bubbles. For the same purpose, the labels about to be affixed may have already been made of fabrics, porous substances, or perforated foils. Although these foils can be normally affixed without forming bubbles other shortcomings arise which militate against their effective application. The labels to be affixed normally bear illustrations and a printed text. To prevent damaging the print or impression by wear, transparent foils are employed, the printed text being impressed on the surface which is to be laid on the surface of the hollow article. Therefore, use of a roughened surface or the use of a fabric or a perforated foil is unfavorable for this purpose, since the sharpness of the printed text is deleteriously affected by the roughened or perforated surface.

Moreover, the cavities formed in the foil or web surface by roughening or by employing a fabric may be filled by the printing ink, whereby spot-like bubbles may arise in printed parts having large areas wherein the air cannot be uniformly distributed. The same problems arise with respect to perforated foils in which the perforations may also be clogged by the ink in the printed areas whereby the formation of bubbles are not easily prevented.

In the interest of maintaining a sharp text reproduction on the labels, foils should be used which allow a clear and unobjectionable impression of the textual and pictorial subject matter. In a known label-applying method, a plunger is displaceably arranged in the opening of a blow mould, the plunger surface having a curvature corresponding to the curvature of the blown hollow article. The label to be applied to the hollow article is laid on the plunger in an optional manner, for example by hand or by punching, and is held in the correct position thereon; for example, the plunger may be provided with suction drillings or bores for retention of the label. The procedure employed is that during the closing operation of the blow mould, the plunger bearing the label is moved to the mould-closing position so that the label is situated in its final position relative to the hollow article during the inflation or blowing of the same. In this known procedure, air bubble formation may not be entirely avoided between the label and the hollow unit when employing a label with a smooth surface, since the air present between the label and the hollow unit cannot be drawn off during the inflation of the hollow unit. It is therefore advantageous to employ labels in the form of roughened or perforated foils.

It is an object of the invention to apply a label or plate to an article being blow-moulded in such a manner as to avoid the inclusion of air between the label or plate and the article.

According to the present invention, a plunger bearing a label or plate is held during the blowing operation in a position retracted from the mould wall and, when the label or plate comes in contact with the inflating blank, the plunger is advanced to an inner position substantially flush with the moulding wall while the air present between the label and the blank is drawn off. The invention is based on the recognition that a bubble-free application of a label on a hollow blank may be obtained if, upon contact between the hollow blank and the label, the latter initially comes into contact with the blank at a central part of the label, thus forming ambilateral wedge-shaped airspaces on either side of the contact point, which are caused gradually to diminish by the displacement of the plunger into the mould, the label concomitantly coming into complete contact with the hollow article, since the air present in these spaces is pressed gradually outwardly. To this end, the advancing displacement of the plunger should begin when the inflation blank comes into contact with the middle of the label, to which end the feed displacement should be controlled in such manner that the plunger retracted from the mould wall and bearing the labels is displaced towards its inner position when the tubular blank comes into contact with the label. In a method of operation in which the label is punched out directly into the mould, the procedure used at the instant of the punching and/or displacing operation is such that the contact between the label and the tubular blank equally occurs in a position in which the plunger is retracted from the wall of the mould before further advance occurs to the inner position, the air between the element and the inflation blank also being evacuated in this case.

A further feature of the invention resides in that a label punched out of a web of foil may be picked up by a transmission member, placed on the plunger and pressed against its surface by blowing. This feature offers special advantages in the case of blowing or inflation machines with several closing systems and blow moulds, since it is possible to incorporate a single punching device which is adapted to feed all the blow moulds, while the label produced at the punch station is placed on the plungers of the separate blow moulds by a transfer member and is pressed against the surface by blowing. In this manner for each separate blow mould, the label is placed in the correct position and is pressed on the plunger held in the retracted position by means of the positively guided transfer member. If an electrostatically charged foil is employed, the label which is pressed-on by the transfer member adheres to the plunger, whereas in the case of foils which are not electrically charged, the plunger may be equipped in manner known per se with suction ducts.

In the process according to the invention air inclusions between the label and the hollow unit are substantially prevented if the label has a substantially constant width. In the case of labels wherein the width varies with the label diminishing from a greater to a lesser width along its length, air inclusions may, however, be formed at the point of transition between the greater and lesser width of the label. Since the peripheral shape of the plunger carrying the label must correspond to the peripheral shape of the label, the blank under inflation penetrates more deeply into the opening of the mould receiving the plunger at the points of greater width than at those of lesser width. Accordingly, the surface of the blank may come into contact with the label sooner at the point of greater width than at the area of lesser width, with concomitant formation of air inclusions and the point of transition between the greater and lesser widths. To prevent such air inclusion in the case of labels varying in width, the process is further characterized in that prior to contact with the inflation blank, a central area of the label is convexly shaped. Due to the convexity of the label, and prior to the area of transition between different widths of the same coming into contact with the inflation blank, the area of the inflation blank tending to form air inclusions and the label are brought into premature contact, so that the air is evacuated through the wedge-shaped spaces formed at either side of the contact area.

A device for carrying out the process is characterised in that an opening of the blow mould guiding the plunger is formed with grooves intended for venting the air pressed out from between the label and the blank.

The transfer member may be formed as a plunger which on its end face has one or more resilient, central and projecting suction and blast nozzles and a multiplicity of laterally situated blast nozzles. The central nozzles of the transfer member wrought as a plunger simultaneously serve the purpose of suction and blast nozzles, whereas the nozzles situated laterally are blast nozzles only. Upon picking up a label at the punching station, the central nozzles are operated as suction nozzles which retain the label until the transfer plunger comes into contact with the plunger situated in the mould opening. After this, the lateral blast nozzles are actuated, which press the label against the surface of the plunger; upon withdrawing the transfer plunger, the central nozzles are fed with blast air to free the transfer plunger from the label.

Another feature of the invention for providing a label on the mould plunger with a central convexity consists in that on its base, the plunger may have a terminal plate forming a chamber which in use is placed in communication with a source of negative pressure or suction, and that in the base of the plunger there is provided an insert plate bridging the ducts of the area over which the label is to be convexly formed and forming a chamber in which in use is placed in communication with the source of optional suction or pressure. The chamber formed by the terminal plate can be placed in communication, through ducts or perforations with the part of the label which is to be held in contact with the surface of the plunger, whereas the chamber formed by the insert plate can be placed in communication, through ducts or perforations, with the area of the label to be convexly shaped, so that upon feeding compressed air into this chamber, the required convexity is established over the required area.

A modified form of mould is characterised in that the insert plate is arranged over the area of the plunger base corresponding to the area over which the label is to have a convexity in the chamber of the terminal plate and is equipped with a connector which can be placed in communication with a duct or perforation formed in its centre, for the source of optional suction or pressure. No insert plate is provided in the base of the plunger in this embodiment; instead, the chamber formed by the terminal plate has situated in it an intermediate plate which rests on the base of the plunger and has a central bore which can be placed in communication with a corresponding bore in the plunger. The required convex shape of the label is formed when this bore is connected to a source of compressed air, while all the perforations of the plunger situated in the area of the insert plate are closed. The size of the area to be convexly formed may be varied by varying the size of the insert plate. If the convex shaping action is to occur over a small area, the size of the insert plate is chosen in such a manner that it does not cover and seal off the perforations of the plunger situated outside this area, so that these are under the action of the negative pressure prevailing in the chamber of the sealing plate or closing plate and hold the label in contact with the surface of the plunger. The size of the area of the label which is to be convexly shaped in each case can be determined in this manner.

Another modified form of the device is characterised in that an insert plate corresponding to the area to be convexly shaped, and having a central bore for the source of suction and pressure, is arranged in the end face of the plunger, an annular gap under suction pressure being formed between its periphery and the plunger. In this modification of the device, there is no insert plate situated in the chamber of the closing plate; instead, an insert plate corresponding to the size of the area to be convexly shaped is arranged in the surface of the plunger in such manner that an annular gap is formed between the edge of the insert plate and the plunger, which is in communication through a perforation of the plunger with the negative pressure chamber of the closing plate, so that the label is held in contact on the surface of the plunger at the edge of the insert plate. The central bore of the insert plate is connected to the pressure source, so that the label is convexly shaped in the area of the insert plate. The areas of the plunger surface situated externally to the insert plate are in communication, in a manner known per se, with the source of negative pressure through perforations or ducts.

Further features and advantages of the invention will be apparent from the following description of embodiments of the invention, given by way of example only and with reference to the accompanying drawings, in which:

FIG. 10 is a diagrammatic view of a closed mould with an un-inflated blank and a label inserted onto a modified form of plunger;

FIG. 11 is a view corresponding to FIG. 10, with the label having an upwardly directed convexity formed in its central area;

FIG. 12 is a view corresponding to FIG. 11 with the hollow article inflated and coming into contact with the label convexity;

FIG. 13 is a view corresponding to FIG. 12 with the plunger in its inner position;

Figure 1:
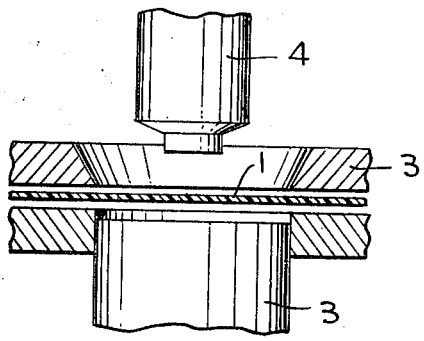
FIGS. 1 to 4 are diagrammatic views of a punching device and transfer plunger in different operating positions.
Figure 2:
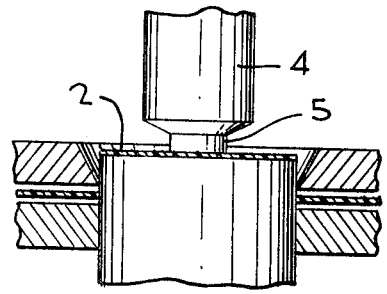
Figure 3:
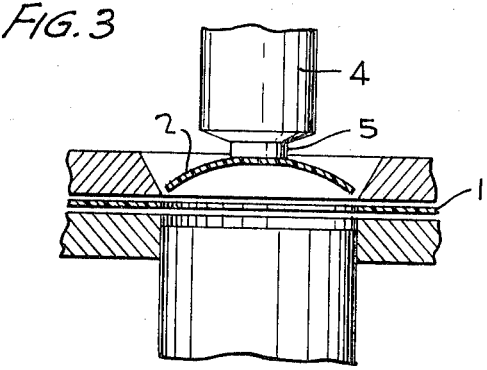
Figure 4:
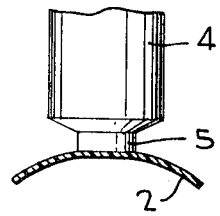
Figure 5:
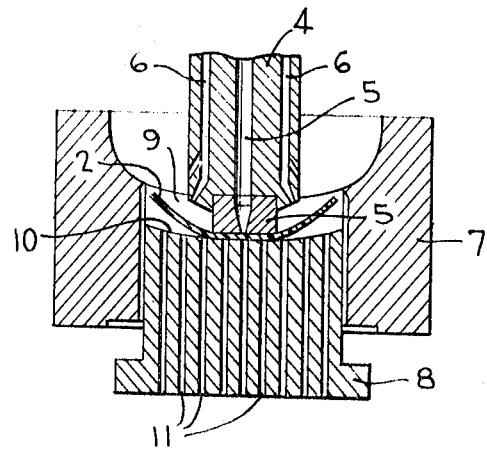
FIGS. 5 and 6 are diagrammatic sectional views of a mould half with a label being placed on a plunger situated in an opening in the mould half.
Figure 6:
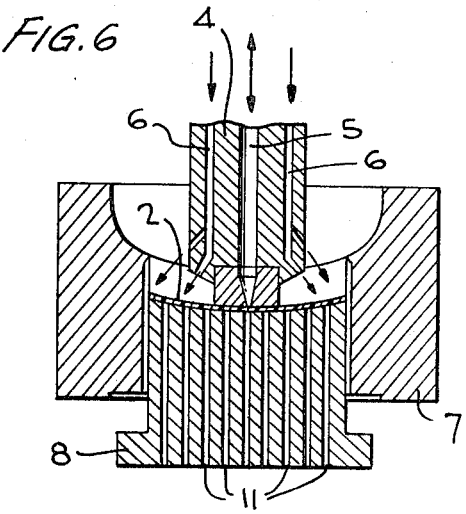
Figure 7:
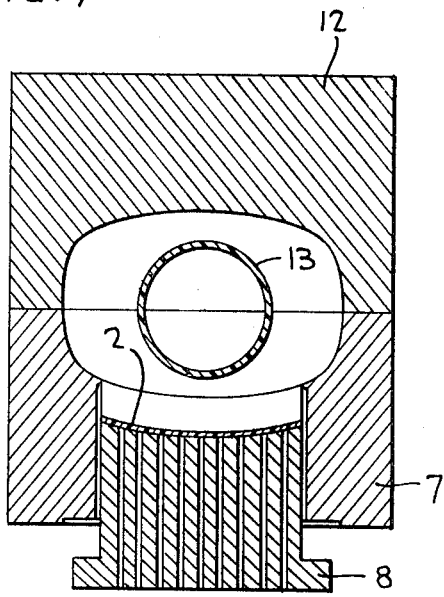
FIG. 7 is a diagrammatic illustration of the closed mould with an un-inflated tubular blank thereon.

FIGS. 1 to 3 show a punching device in which labels 2 are punched out of a foil web 1 by a punching tool 3. The punched out label 2 is received by a transfer plunger 4, as apparent from FIG. 2. On its end face, the transfer plunger 4 has a projecting resilient nozzle 5, and as shown in FIG. 5, lateral nozzles 6. Upon receipt of the label 2, the central resilient nozzle 5 is operated as a suction nozzle, the label 2 concomitantly being lifted out of the punching tool 3 as shown in FIG. 3, and being carried to the mould half 7 as shown in FIG. 7. At this point, as shown by FIG. 5, the label 2 is pressed onto a plunger guided in an opening 9 of the mould half 7, by means of the resilient nozzle. The plunger 8 has an end face 10 which is curved corresponding to the ultimate shape of the hollow article being moulded. When the transfer plunger 4 comes into engagement with the plunger 8, as apparent from FIG. 5, the nozzles 5 and 6 are operated as blast nozzles according to FIG. 6, the label 2 thereby being pressed onto the end face 10 of the plunger 8. The label 2 is held in the position shown in FIG. 6, by means of suction bores 11 formed in the plunger 8.

Figure 8:
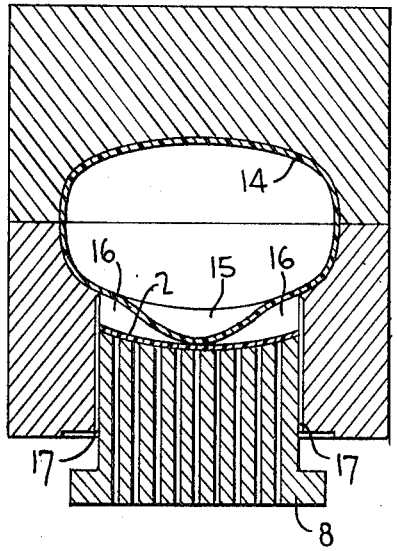
FIG. 8 is a view corresponding to FIG. 7, with the inflated blank coming into contact with the middle of the label.
Figure 9:
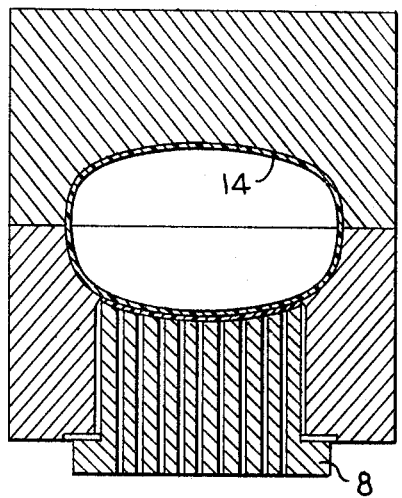
FIG. 9 is a view corresponding to FIG. 8 with the plunger at its inner position.

FIG. 7 shows the closed mould, formed by the lower mould half 7 and of an upper mould half 12. Within the mould halves 7, 12 is a moulding blank 13 in the form of a tube, which is blown up into the hollow space-defined by moulds 7, 12. As shown by FIG. 8, the plunger 8 remains in its retracted position during inflation of the tubular blanks 13 until this blank has developed into a hollow article 14 bearing against the sides of the moulds 7, 12. As shown by FIG. 8 this produces a pouch-like protrusion 15 in the area of the plunger 8, this protrusion coming into contact on the middle of the label. The advance of the plunger 8 into the mould closing position shown in FIG. 9 is then initiated. As apparent from FIG. 8, two hollow spaces 16 filled with air and widening in wedge shape from the middle of the label 2, are situated between the label 2 and the pouch-like protrusion 15. During the feed motion of the plunger 8 from the position shown in FIG. 8 to the mould-closing position according to FIG. 9, these spaces are reduced gradually until they disappear completely (see FIG. 9). The air is concomitantly squeezed out from the middle of the label 2 towards both sides, to prevent blisters being formed between the label 2 and the pouch-like protrusion 15 of the hollow unit 14. In order that this air squeezed out of the spaces 16 during the displacement of the plunger 8 may be evacuated, the opening 9 of the mould half 7 has grooves 17, through which the air issuing from the spaces 16 is drawn off at the edge of the label 2 whereby a full-area contact of the label 2 is produced throughout the surface. The label can project beyond the hollow unit, but it may also be recessed in the hollow unit in such a manner that its outer surface lies flush with the surface of the hollow unit.

FIG. 10 shows a closed mould consisting of lower mould half 7 and upper mould half 12. Within the mould halves 7 and 12 is situated the tubular formed blank 13 which is to be blown into a hollow article in the moulds 7, 12. Prior to inflation of the blank 13, a label 2 is convexly shaped in a central area as shown by FIG. 11. To this end, a closing or terminal plate 19 is fastened under the base of the plunger 8, forming a chamber 20 which is connected to a source of suction or negative pressure, the latter not being illustrated. The peripheral area of the label 2 is held in contact with the surface of the plunger 8, by means of this source of negative pressure. In the base of the plunger 8 is situated an insert plate 21, forming a chamber 22 in communication with a source of pressure which can generate suction as well as pressure. Upon placing the label 2 on the plunger 8, a negative pressure is applied in the chambers 20 and 22, so that the label is held firmly on the surface of the plunger. Positive pressure is thereafter is fed to the chambers 22 for the purpose of forming the convexity of the area 18, compressed air passing under the label 2 through the perforations 27 situated in the area of the insert plate 21, establishing the convexity in the area 18 of the label 2.

After forming the convexity, the tubular blank is inflated into a hollow unit 14 bearing against the sides of the moulds 7, 12. As apparent from FIG. 12, the hollow unit 14 comes into contact at a point 15 with the highest point of the convexly shaped area 18. During advance of the plunger 8 into the inner position shown in FIG. 13, the air is drawn off from the wedge-shaped intermediate spaces 23 through the grooves 17, so that an inclusion of air is effectively prevented.

Figure 14:
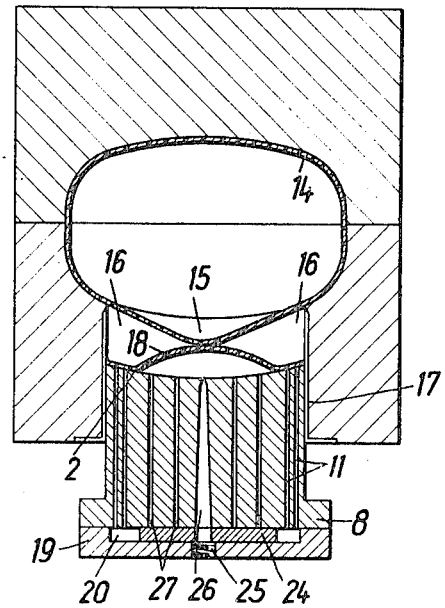
FIG. 14 is a view corresponding to FIG. 12 of another form of plunger.

In the form of embodiment according to FIG. 14, the chamber 20 has situated therein an insert plate 24 which is in contact with the base of the chamber 20 as well as with the underside of the plunger 8. The insert plate has a central bore 25 which is connected to a source of suction or compressed air, the latter not being illustrated, and is in communication with the central drilling 26 of the plunger 8. Two drillings 27 situated at either side next to the bore 26 are closed off at the underside by the insert plate 24, so that the negative pressure chamber 20 is in communication only with the two outer perforations 11 of the plunger 8 whereby the label 2 is held in contact with the surface of the plunger only in the area of these perforations 11 when compressed air is fed under the label 2 through the drillings 25, 26.

The area 18 may be increased or reduced in size by dimensioning the insert plate 24 accordingly. For example, if a smaller insert plate 24 is chosen, it covers a lesser number of drillings 27, thus reducing the size of the convexly shaped area 18.

Figure 15:
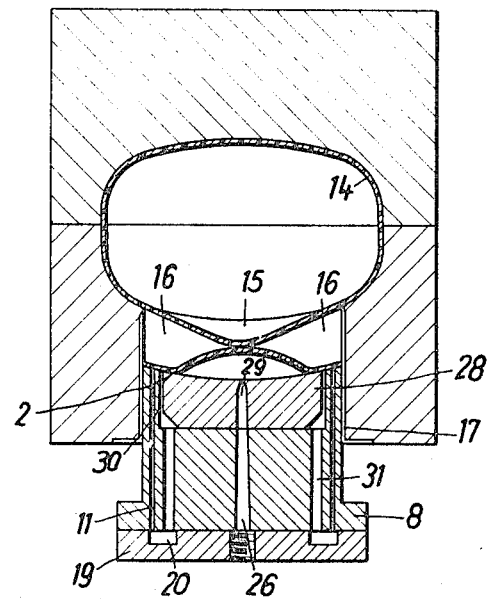
FIG. 15 is a view corresponding to FIG. 12 of yet another modified form of plunger.

FIG. 15 shows another modified form of mould in which the insert plate 24 is replaced by an insert plate 28 in the end face of the plunger 8, this insert plate 28 having a central drilling 29 which is in communication with the bore 26 of the plunger 8 and is connected to a source supplying suction or compressed air, this source not being illustrated. Between the insert plate 28 and the plunger 8 is present an annular encircling gap 30 which is in communication with the negative pressure chamber 20 through a drilling 31. Owing to the action of the negative pressure chamber 20, the label is held in contact on the surface of the plunger at the edge of the insert plate 28, whereas the convex shape of the area 18 is produced by feeding compressed air through the drilling 29, 26. In this case too, the area 18 of the convexity may be established at an optional point of the surface of the label 2 and with an optional size, by selecting an inert 28 of appropriate size and shape.

I claim:

1. Process for the application of labels on hollow bodies made of thermoplastic synthetic material produced by a blow-moulding process, comprising:

(a) positioning a prepared label on a member which is movable with respect to a section of a blow mould, one end of said member having a curvature corresponding to the curvature of the mould cavity and forming a section of said cavity;
(b) maintaining said member which carries said prepared label in a retracted position with respect to said blow mould cavity;
(c) inserting a blow blank into said blow mould cavity;
(d) causing the central portion of said label within its periphery to be arched-out in the direction of said blow blank;
(e) blowing-up said blow blank;
(f) moving said member which carries said prepared label inwardly, upon contact of said label with the expanding blow blank, into a final position in said blow mould corresponding to the mould cavity wall so as to progressively increase the area of contact and exclude the air from between said label and said expanded blow blank; and
(g) passing at least some of said excluded air to the exterior of said mould.

2. The process according to claim 1 wherein said blow blank is blown up in such a manner as to effect a blown protrusion thereon within the area of said label and extending in the direction of said label.

3. The process according to claim 1 wherein said label is positioned on said movable member while the mould is open, and including the further step of holding said label on said movable member by means of a suction applied through first duct means located in said member, and wherein said blow blank is inserted into said blow mould cavity and blown up after said mould is closed.

4. The process according to claim 3 wherein said first duct means in said movable member is located in the vicinity of the peripheral portion of said label and wherein said label central portion is caused to be arched-out so as to present a convex surface in the direction of said blow blank by means of air pressure applied through second duct means in said movable member located in the vicinity of said label central portion.

References Cited

UNITED STATES PATENTS

| | | | |
|---|---|---|---|
| 3,227,787 | 1/1966 | Battenfeld | 264—98 |
| 3,267,186 | 8/1966 | Battenfeld | 264—98 |
| 3,272,681 | 9/1966 | Langecker | 264—98 |

ROBERT F. WHITE, Primary Examiner

J. R. THURLOW, Assistant Examiner

U.S. Cl. X.R.

18—5 BL; 156—518; 264—90, 94, 278